UNITED STATES PATENT OFFICE.

HANS JERNE, OF FINSBURY, LONDON, ENGLAND.

CONSERVATION OF EGGS.

1,043,600.

No Drawing.

Specification of Letters Patent.

Patented Nov. 5, 1912.

Application filed January 12, 1912. Serial No. 670,907.

*To all whom it may concern:*

Be it known that I, HANS JERNE, a subject of the King of Denmark, residing at 145 Farringdon road, Finsbury, in the county of London, England, have invented certain new and useful Improvements Relating to the Conservation of Eggs; and I do hereby declare the following to be a full, clear, and exact description of the invention, such as will enable others skilled in the art to which it appertains to make and use the same.

This invention relates to the conservation of eggs, and has reference to the coating of the shells with antiseptic and preservative substances with a view to keeping them "fresh" during storage.

According to this invention there is formed upon the shell of each egg a coating or layer of a composition that contains a large percentage of camphor, which, by slow evaporation during storage, maintains around the egg an antiseptic atmosphere of camphor vapor.

A satisfactory method of procedure is to add to cellulose a quantity of camphor sufficient to bring the percentage of the latter up to about forty-five; alternatively cellulose may first be treated with an appropriate quantity of nitric acid and the requisite amount of camphor then added. In either case the material so obtained is reduced to the condition of a thin transparent or semi-transparent jelly by the action of a suitable organic solvent, preferably amyl acetate. This jelly-like composition is stored in airtight vessels until required for use, when it is placed in a bath or tank, and the eggs are dipped in it. The layer or coating adhering to the shell of each egg after immersion quickly sets or hardens to form a cover impermeable by micro-organisms or moisture, and the egg can then be stored until required for use. During storage, the air around the eggs becomes permeated with camphor vapor, but, since this air is stagnant, the vaporization of the camphor is quite slow, and an antiseptic atmosphere of camphor vapor is therefore maintained for a long period. Since the composition contains a large amount of camphor, the taste of the egg might become slightly affected unless the shell were first rendered impervious to the composition, and it is therefore advantageous to dip each egg into a solution of gelatin before dipping it into the composition above referred to. In addition to the antiseptic effect of the camphor vapor, the rendering of the shell impervious to water vapor from the air prevents the displacement of the yolk due to dilution of the "white".

In order that the invention may be clearly understood and readily carried into effect, I will now describe one specific method of procedure.

A quantity of cellulose is first converted into a jelly-like composition by thoroughly impregnating it with nitric acid, the quantity of the latter required for this purpose being from 15 to 20 parts (by weight), for every 100 parts of cellulose. To this jelly-like composition (nitro-cellulose), camphor is then added gradually until it amounts to about 45 per cent. of the whole, the effect of this addition being to produce a material similar in some respects to celluloid, but containing more camphor—as already mentioned. This material is then placed in a bath containing amyl acetate which is kept hot (at from 50° C. to 60° C.) by the circulation of hot water around the bath or by any other convenient means; alternatively the amyl acetate may be added to the aforesaid material. In either case the quantities used are such as to produce a thin jelly-like composition; I have found it satisfactory to use the amyl acetate and the celluloid-like material in the proportion of ten parts to one by weight. This bath of liquid is then ready for use and the eggs are dipped in it one or more at a time, after having been first dipped into a solution of gelatin to close up the pores of the shell and thus prevent the camphor of the subsequent coating from penetrating the shell.

The coating of gelatin should be allowed to dry before the second coating is applied. This second coating quickly solidifies upon the surface of the eggs and the latter are then ready to be stored. Owing to the solidification of the material of the second coating, any of the coating material that remains in the bath should be stored out of contact with the air until it is again required; any of the material that happens to have been exposed so long as to have solidified can be dissolved in amyl acetate and added to the next bath.

Amyl acetate is preferred as solvent owing to the fact that the jelly-like composition obtained by its use is transparent; however, so far as the mere dissolving action is concerned, acetone might be employed, or methyl acetate, but, with the latter substance in particular, the composition obtained produces an opaque coating or layer and for that reason may be considered objectionable.

What I claim and desire to secure by Letters Patent of the United States is:—

1. A method of conserving eggs, consisting in first coating them with a thin layer of gelatin, and then with a layer of a composition capable of maintaining around the shell of each egg, during storage, an atmosphere of camphor vapor.

2. A method of conserving eggs, consisting in first coating them with a thin layer of gelatin, and then with a layer of a celluloid-like composition capable of maintaining around the shell of each egg, during storage, an atmosphere of camphor vapor.

3. A method of conserving eggs, consisting in first dipping them in a solution of gelatin, and then into a solution of a composition capable of maintaining around the shell of each egg, during storage, an atmosphere of camphor vapor.

4. A method of conserving eggs, consisting in first dipping them in a solution of gelatin, and then into a solution in amyl acetate of a composition capable of maintaining around the shell of each egg, during storage, an atmosphere of camphor vapor.

5. An egg having upon its shell a coating of a composition capable of maintaining around it, during storage of the egg, an atmosphere of camphor vapor.

6. An egg having upon its shell a coating of a celluloid-like composition capable of maintaining around it, during storage of the egg, an atmosphere of camphor vapor.

7. An egg having upon its shell a coating of gelatin and a second coating of a composition capable of maintaining around it, during storage of the egg, an atmosphere of camphor vapor.

8. An egg having upon its shell a coating of gelatin and a second coating of a celluloid-like composition capable of maintaining around it, during storage of the egg an atmosphere of camphor vapor.

In testimony whereof I affix my signature in presence of two witnesses.

H. JERNE.

Witnesses:
T. SELBY WARDLE,
WALTER J. SKERTEN.

Copies of this patent may be obtained for five cents each, by addressing the "Commissioner of Patents, Washington, D. C."